United States Patent
Alsaadi et al.

(10) Patent No.: US 11,449,499 B1
(45) Date of Patent: Sep. 20, 2022

(54) SYSTEM AND METHOD FOR RETRIEVING DATA

(71) Applicant: Yellowbrick Data, Inc., Palo Alto, CA (US)

(72) Inventors: Adel Alsaadi, Fremont, CA (US); Paritosh Kulkarni, San Jose, CA (US); Jim Peterson, San Jose, CA (US)

(73) Assignee: Yellowbrick Data, Inc., Mountain View, CA (US)

( * ) Notice: Subject to any disclaimer, the term of this patent is extended or adjusted under 35 U.S.C. 154(b) by 260 days.

(21) Appl. No.: 16/543,458

(22) Filed: Aug. 16, 2019

Related U.S. Application Data (60) Provisional application No. 62/719,041, filed on Aug. 16, 2018.

(51) Int. Cl.
*G06F 16/245* (2019.01)
*G06F 9/30* (2018.01)
*G06F 16/22* (2019.01)

(52) U.S. Cl.
CPC ........ *G06F 16/245* (2019.01); *G06F 9/30098* (2013.01); *G06F 9/30181* (2013.01); *G06F 16/221* (2019.01)

(58) Field of Classification Search
CPC ............. G06F 16/0245; G06F 16/0221; G06F 9/30098; G06F 9/30181; G06F 12/0246; G06F 16/1844; G06F 16/1847; G06F 16/24557; G06F 16/245; G06F 16/221
USPC ........................................................ 707/722
See application file for complete search history.

(56) References Cited

U.S. PATENT DOCUMENTS

| | | | |
|---|---|---|---|
| 8,924,429 B1* | 12/2014 | Fisher | G06F 16/23 707/802 |
| 10,359,962 B1* | 7/2019 | Peterson | G06F 3/0679 |
| 10,740,474 B1* | 8/2020 | Ghetti | H04L 9/321 |
| 2008/0004096 A1* | 1/2008 | Graepel | G09B 19/22 463/9 |
| 2012/0084284 A1* | 4/2012 | Kang | G06Q 30/0282 707/732 |
| 2012/0084287 A1* | 4/2012 | Lakshminarayan | G06F 16/24545 707/737 |
| 2013/0166553 A1* | 6/2013 | Yoon | G06F 16/245 707/E17.089 |
| 2013/0166554 A1* | 6/2013 | Yoon | G06F 16/283 707/737 |
| 2017/0255675 A1* | 9/2017 | Chavan | G06F 16/24562 |
| 2018/0373561 A1* | 12/2018 | Nassi | G06F 11/3452 |
| 2020/0067861 A1* | 2/2020 | Leddy | H04L 51/12 |

* cited by examiner

*Primary Examiner* — Sheree N Brown
(74) *Attorney, Agent, or Firm* — Innovation Partners LLC; Charles E. Gotlieb (57) ABSTRACT

A system and method uses a set of processors that each perform a logic function to identify portions of a data source meeting a criteria. Each logic function is performed against a row of a column of the data source, and a value that is derived from the criteria for that logic function, which is also derived from the criteria. The output of each of the logic functions is applied as an address to a table that has been configured to read true at the addresses corresponding to the criteria being met, and false otherwise. Data from the row of the database table having a table value of true are retrieved from the data source.

18 Claims, 4 Drawing Sheets

SYSTEM AND METHOD FOR RETRIEVING DATA

RELATED APPLICATION

This application claims the benefit of U.S. Provisional Patent Application Ser. No. 62/719,041 entitled "Method and Apparatus for Retrieving Data filed on Aug. 16, 2018 by Adel Alsaadi and Paritosh Kulkarni, having the same assignee as the present application, and is incorporated herein by reference in its entirety.

FIELD OF THE INVENTION

The present invention is related to computer software and hardware and more specifically to computer software and hardware for data retrieval.

BACKGROUND OF THE INVENTION

Data retrieval techniques are currently suboptimal. What is needed is a system and method for data retrieval.

SUMMARY OF INVENTION

A system and method converts a criteria from a request for certain portions of a data set into a set of values and logic lookup tables. The values are used by a set of logic functions to test a column of a row or other portion of the data set. The output of the set of logic functions are used to address the logic lookup table for the column, which has been prepopulated with 1s and 0s that read 1 when the criteria is met for that column and 0 otherwise. Other functions may also be used to address the logic lookup table that do not involve single values, such as a null test, a validity test, and a bloom filter test that identifies whether the column corresponds to the bloom filter.

DETAILED DESCRIPTION OF A PREFERRED EMBODIMENT

Figure 1:
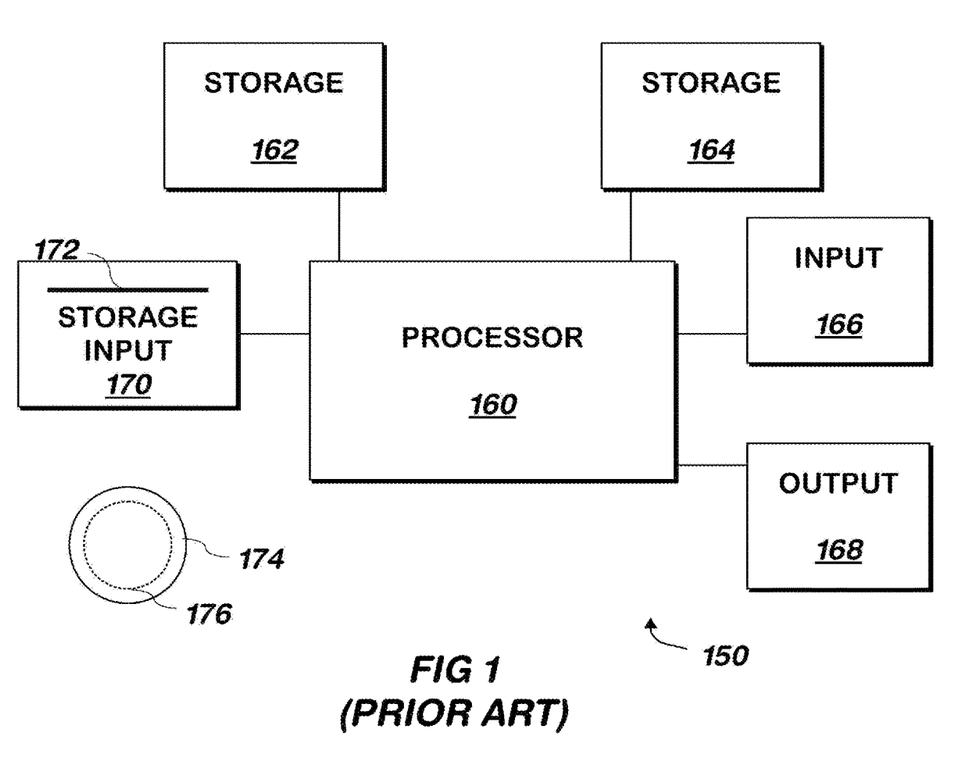
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. The components of the system described herein may be implemented via one or more hardware computer processors that operate under firmware or hardware control as described herein.

Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional ORACLE SPARC T SERIES SERVER running the ORACLE SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as WINDOWS 10) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S9 commercially available from SAMSUNG ELECTRONICS GLOBAL of Seoul, South Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2:
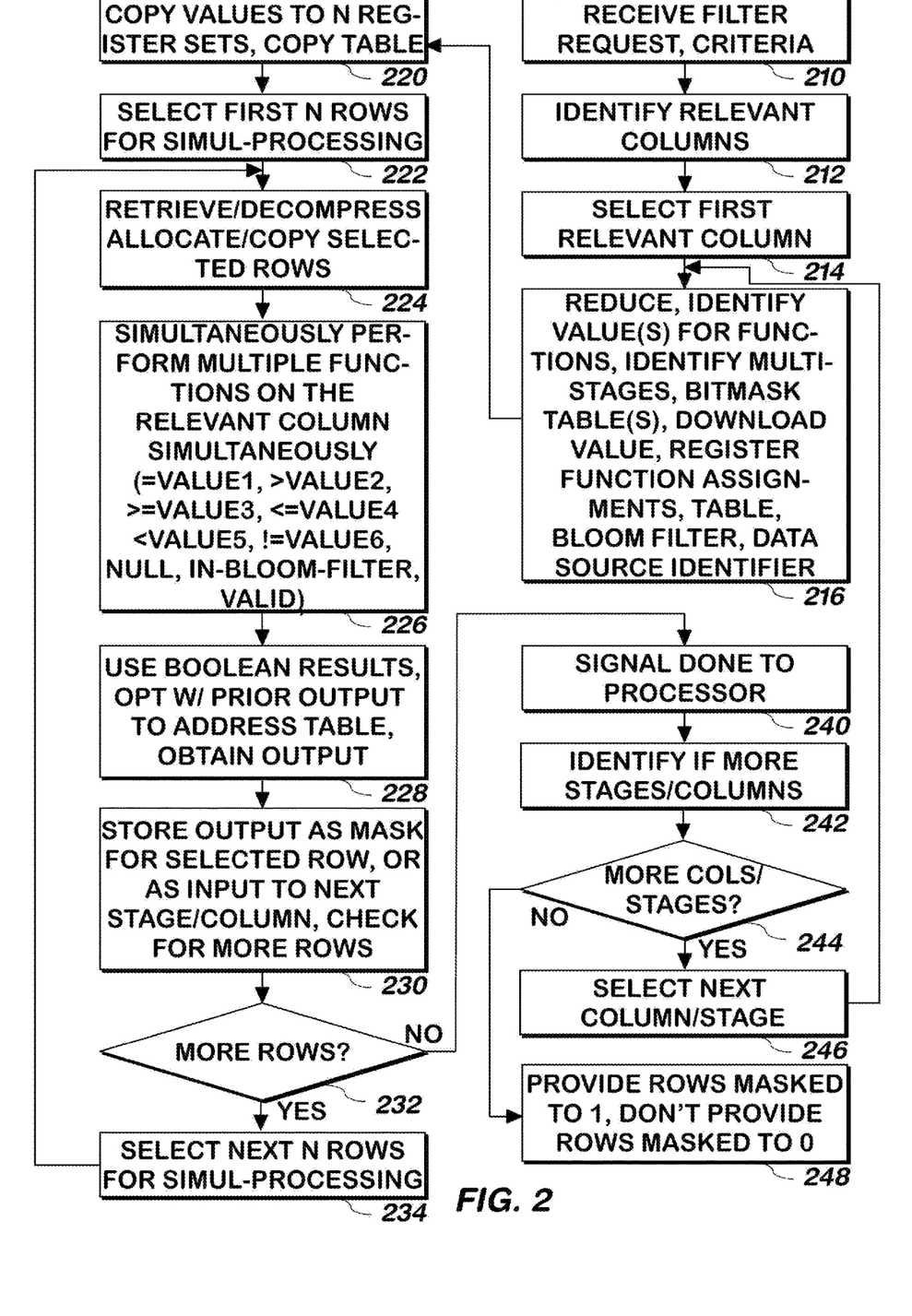
FIG. 2 is a flowchart illustrating a method of retrieving data according to one embodiment of the present invention.

Referring now to FIG. 2, a method of processing a filter request, such as a query from a database, using a field programmable gate array (FPGA) or other similar device and a microprocessor, is shown according to one embodiment of the present invention. Although an FPGA is used herein, any type of electronic device may be used, such as an ASIC, custom or preconfigured set of processors such as a graphics card, or other type of hardware accelerator.

A filter request is received by a hardware computer processor 210. The filter request includes a criteria to use to filter a larger set of data into what is typically a smaller set of data that meets the criteria. The processor identifies the relevant columns from the request 212, and selects 214 the first relevant column. Although rows and columns are used herein, as would be contained in a conventional database table, other portions of data may be employed by the present invention. In one embodiment, relevant columns are those used on one side of an operator, like '>'. In a query "Select Y where X=100", X is the relevant column. In a query "Select Y where X>Z", either X or Z may be considered to be the relevant column.

Values needed to process the request are identified by the processor, along with their functions 216, using the request. In one embodiment, the functions are selected from a limited set, such as "less than a first value", "less than or equal to a second value", "equal to a third value", "greater than a fourth value", "greater than or equal to a fifth value", "not equal to a sixth value", "detection of null", "detection of corresponding to a bloom filter" and "detection of validity". The functions and values are identified from the criteria, and are used to identify whether the criteria is met. For example, if the filter request is "Select Y where 7<=X<=21 OR X=100 && X=!Null", X is the only relevant column and the [functions and value] identified are ['>=", "7"], ["<=", "21"], ["=", 100"], and "Null detection". (As used herein, the ! symbol means "not", so "!Null" is "not null").

In one embodiment an attempt is made to reduce, or simplify the criterial as part of step 216, so that if the filter request were 7<=X<=21 OR X=100 && X=!Null OR X=20", the "X=20" would be removed as redundant. Other forms of preprocessing may be performed by the processor as part of step 216, include building a temporary database table, for example for the criteria "where X>Y+Z", building a database table (or adding a column to the database table) with a row that has the value Y+Z for each row in the original database table.

In one embodiment, each register may perform any of the functions described, and as many of the registers are used as are needed to process the request. For example, half the registers may be used to perform equivalence or non equivalence and the other half of the registers may perform greater than, greater than or equal to, less than or less than or equal to functions if required. The function to be performed by each register is determined in addition to the value as part of step 216. In one embodiment, there are two groups of registers that process any given row: one group of 6 registers can perform any of the greater than, greater than or equal to, equal to, not equal to, less than, or less than or equal to, functions. The other group are specialized registers that each perform one function: detection of null, detection of in bloom filter, and valid. However, other embodiments may use registers with different capabilities, and numbers of registers that perform any given function, or one group of registers that performs all functions.

Step 216 includes assigning the value to each register that uses a value and assigning the function to be performed by that register. If there is an excess of registers, the table may be assigned values that don't care what the value of the unused registers are or the registers may be assigned a no operation function and will generate a logic 0 or logic 1.

In one embodiment, multiple stages are used if there are an insufficient number of registers capable of performing the functions needed for evaluation using a single stage. In one embodiment, the selected relevant column is checked to determine whether it must be processed in multiple stages, and the stages are identified to ensure that as few stages as possible are used as part of step 216. In one embodiment, minimization of registers is performed only if the number of stages exceeds one, and otherwise, no such minimization is performed.

In one embodiment, all values in a stage are a single type, either integer, or real, though other types may be used. In still another embodiment, each value may be of a specified type for that value, and different values may be of different types.

In one embodiment, in addition to integer or real number values, the value from a column may be specified in the criteria, and the column is specified by the processor in place of a numeric value.

Step 216 also includes the processor building a logic lookup table of Boolean values 0 or 1 that indicate whether the criteria have been met using the function values and other values described below as an address to the logic lookup table. The logic lookup table is built so that when the Boolean values of each of the various functions described herein are each used as one of the address bits into the logic lookup table, the logic lookup table will output a 1 if the criteria was met and a zero otherwise.

For example, if the request was "Select Y where 7<=X<=21 OR X=100 && X=!Null", when X is 14, the 'X>=7' test will yield 'true' or '1', the 'X<=21' test will also yield 'true' or '1', the 'X=100' test will yield 'false' or '0' and the 'X=Null' test will be 'false' or '0'. If each of these outputs are bits of an address with the first test as the high order bit and the last test as the low order bit, the address would yield 1100. At Boolean address 1100 in the logic lookup table is a single bit "1". In addition, at address 11X0 is a '1', at addresses XX10 are also '1's, and the other addresses have a bit equal to '0' in the logic lookup table. (As used herein as an address, X=don't care, either 0 or 1). The logic and criteria in the request and the values and functions to which such criteria are mapped are used by the processor to build the logic lookup table. As used above with respect to the null test, a "not" or "!" logic function can be used when building the logic lookup table to invert the address bit corresponding to the test to allow the not function to be appended to any of the functions tested. It is noted that the foregoing addresses are for example purposes, and the actual logic lookup table would use one address bit from all functions described, including the validity, null, and bloom filter functions, as well as another address bit from a prior output of the logic lookup table for the row, as described in more detail below.

The logic lookup table, bloom filter (or filters if different), values and function assignment indicators for each register are downloaded from the processor to the FPGA memory as part of step 216. The function assignment indicators specify which function the register is to perform from those the register can perform, including a "don't do anything" function for registers that are to be unused. Alternatively, the number of registers to be used is also provided or inferred from the number of function assignments and values, with other registers assumed to be performing the don't do anything function. In one embodiment, the don't do anything function may be one particular function that does something, such as equivalence, with the table set up to not care what the output of the register performing the function is.

At the FPGA, the values and functions for each function are copied 220 to the corresponding register in N sets of registers. Each of the N sets of registers contains duplicates of each of the registers described above to allow multiple rows or other portions of data to be processed simultaneously in the same manner as described herein. Thus, each set of registers contains an equality register, a not equal register, and so on. As used herein, a register consists of associated logic circuitry that performs one of the functions described herein, and may be referred to as a "processor", as it may contain a conventional hardware processor. In one embodiment, registers for all ten functions are used, and in other embodiments, some registers may perform fewer than all ten functions. The logic lookup table and any bloom filter downloaded from the processor are each copied into FPGA memory N−1 times to produce N copies, or are otherwise made available to each set of registers. Step 220 may include distributing the function assignments to the registers. The same register in each set are provided the same function assignment.

The first N rows of the data source are selected 222. An identifier of the data source may be downloaded from the processor to the FPGA as part of step 216, such data source having been part of the filter request, or the data source may always be the same data source for all filter requests, and the data source is used to obtain the rows.

The relevant column from the selected rows are retrieved from storage decompressed if they were stored in a compressed state 224 and the value of the relevant column for each row of the selected N rows is copied or otherwise made available to all of the registers in one set. In one embodiment, the retrieval is performed by the FPGA itself without using the processor for the retrieval. As noted, the registers in one set are registers that perform the functions described above and herein, as well as functions that identify whether the value is null (which may just use a null bit associated with each value that is copied to that register in place of the value), a valid function, which identifies whether a valid bit associated with the row (that is provided to the register in place of the value) is valid, and a function that identifies whether the value is in a bloom filter (by hashing the value using a conventional hash function that was used to produce the bloom filter and determining whether the value of the hash is in the bloom filter downloaded as described herein. In another embodiment, these three foregoing functions are performed in a special register for each function, with each register set containing all three registers in every set.

Each set of registers processes the value of the relevant column for one of the selected N rows, each set processing a different one of the N selected rows, with each of the registers in the set that compare the relevant column and the register handling the bloom filter receiving a copy of the relevant column for one row. For example, if the relevant column at the row has a value of '6', all such registers in one set (or all registers that require the value to perform the function) will receive '6'. If the value of the relevant column in the next row is 8, all such registers in that set will receive '8'.

The registers simultaneously perform the functions specified by the indicator or the single function performed by that register 226. The comparison functions are performed in a conventional manner. The bloom filter function hashes the value and uses the hash as an index into the bloom filter and extracts the Boolean value at that index. The null function may be performed by using a null bit associated with the value of the selected column at the selected row. Such bit may be obtained with the value and provided to the register that detects a null value. The valid function may be performed using a different bit in a similar manner to the null bit.

The outputs from each of these registers in one set are single bits, and the bits from one set of registers, optionally with a bit corresponding to the output of the immediately prior stage for the row or prior processed column for the row, are used to address the logic lookup table, which had been built for all such addresses in a manner similar to that described above, and the bit in the logic lookup table at that address is output or otherwise retrieved from the logic lookup table 228.

The output of the logic lookup table for each set of processors is stored 230 to be used as the mask for the row or as the additional bit from the prior value to address the logic lookup table when the same row is processed again at the next stage or for the next selected column. The use of the output from a prior stage or column as one of the address bits in the logic lookup table allows the prior stage or relevant column output to be combined using any specified logic function (e.g. ANDed, ORed, exclusive ORed, etc) with the next stage or relevant column, by setting up the logic lookup table of the next stage accordingly.

If there are more rows in the data set 232, the next N rows (or up to N rows) are selected 234 and the method continues at step 224 using the newly selected N rows, and otherwise 232, the FPGA signals 240 the processor it is done processing the selected column or stage.

The processor receives the signal and identifies whether there is another stage for the row, and if not, whether there are additional relevant columns 242. If there is another stage, or if no additional stage, if there is another relevant column 244, the next column or stage is selected 246 and the method continues at step 216 using the newly selected stage or relevant column. If there are no additional stages or relevant columns 244, the rows corresponding to a mask of '1', or requested columns from rows corresponding to a mask of '1', are provided to the processor by the FPGA, and the rows corresponding to a mask of 0 (and their requested columns) are not provided to the processor by the FPGA 248. The identifiers of the requested columns may be obtained by the processor from the request and provided to the FPGA as part of step 216.

It is noted that steps that repeat may be performed sooner than shown in the flowchart. For example, the values, bloom filter and logic lookup table for stages and relevant columns after the first one may be identified and downloaded to the FPGA at step 216 before processing for the prior stage or relevant column has completed. The next N rows may be retrieved and decompressed at step 224 before processing for the prior N rows have completed.

System.

Figure 3:
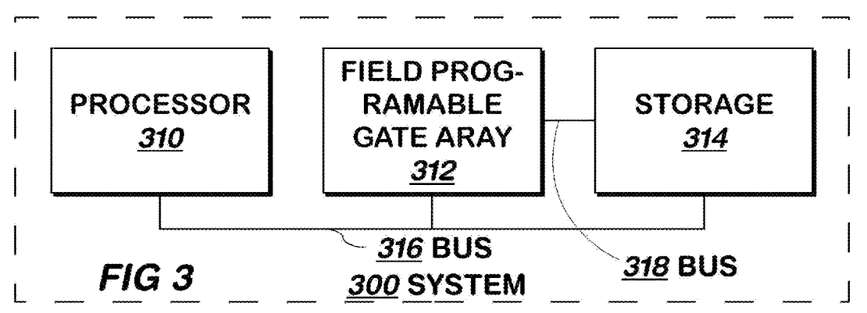
FIG. 3 is a block schematic diagram of a system for retrieving data according to one embodiment of the present invention.

Referring now to FIG. 3, a system 300 for processing requests for data is shown according to one embodiment of the present invention. Processor 310 includes a conventional computer processor running software as described herein, and coupled to bus 316, which may include a conventional bus, such as a conventional PCI bus.

Field programmable gate array 312 is a conventional gate array, such as a conventional field programmable gate array, such as the conventional Xilinx Spartan-7 or Everest available from Xilinx of San Jose, Calif., that is programmed to operate as described herein, or another similar device, and is coupled to bus 316 to communicate with processor 310 and storage 314. Storage 314 is a conventional storage device, including memory, or one or more disk drives or solid state disk drives that is coupled to field programmable gate array 312 via bus 316 or bus 318.

Figure 4:
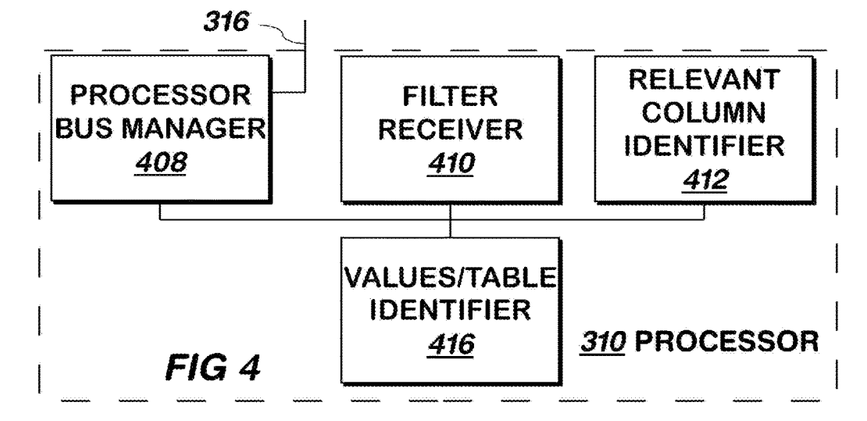
FIG. 4 is a block schematic diagram of the processor of the system of FIG. 3 shown in more detail according to one embodiment of the present invention.

FIG. 4 illustrates processor 310 in operation in more detail. Referring now to FIGS. 3 and 4, the operation of each of the elements of FIG. 4 may occur at different times and each includes part or all of processor 310, as well as portions of a stored program. Filter receiver 410 receives the request as described above and parses it into a data source identifier, the one or more columns requested and the criteria, and provides the data source identifier, criteria and one or more columns requested to relevant column identifier 412.

When it receives the data source identifier, criteria and identifiers of one or more columns requested, relevant column identifier identifies the relevant columns as described above from the criteria and provides the data source identifier, criteria, identifiers of one or more columns requested and identifiers of the one or more relevant columns it identifies to values/table identifier 416.

When it receives the data source identifier, criteria, columns requested and identifiers of the one or more relevant columns, values/table identifier 416 selects the first relevant column from those identified and identifies the functions and values that apply to the selected relevant column from the received criteria, bloom filter if needed, and the logic lookup table for the selected relevant column from the received criteria that apply to the selected relevant column and the values it identifies, and any bloom filter, and builds a request object that contains the data source identifier, which it modifies to include the selected relevant column, indicators of the functions and values for the selected column to apply to each of the registers to be used, the logic lookup table, and a bloom filter if applicable, each as described above.

Figure 5:
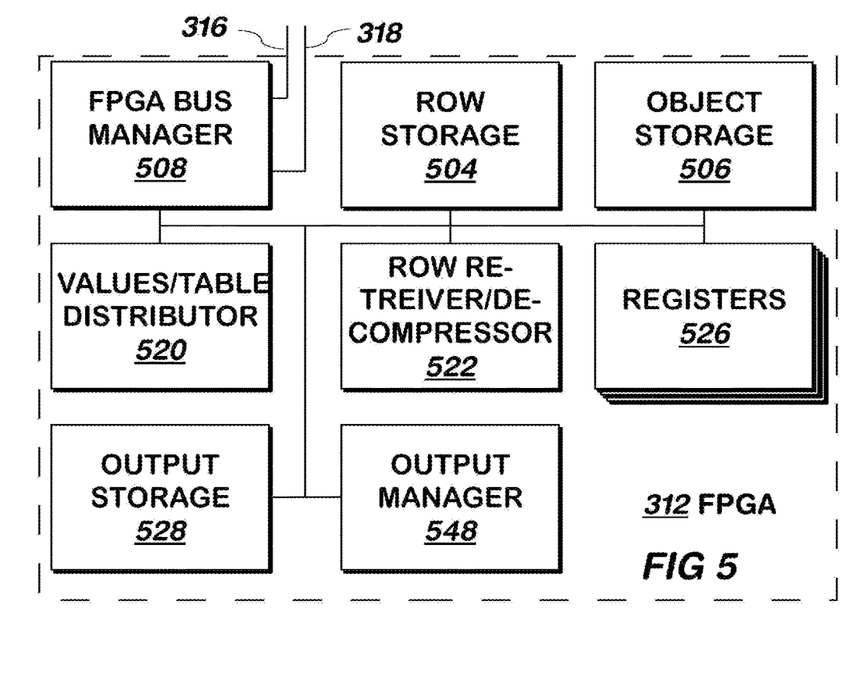
FIG. 5 is a block schematic diagram of the Field Programmable Gate Array or other acceleration hardware of the system of FIG. 3 shown in more detail according to one embodiment of the present invention.

FIG. 5 illustrates field programmable gate array 312 in more detail according to one embodiment of the present invention. Referring now to FIGS. 3, 4, and 5, the request object is provided to processor bus manager 408 which places it on bus 316 and is received by FPGA bus manager 508 which provides it to values/table distributor 520 of FPGA 312. Values/table distributor 520 places the elements of the request object into specific portions of object storage 506, which may each include a conventional memory or latch.

In one embodiment, the specific portions of object storage 506 are available to be read by registers 526 and any other portions of FPGA 312 that may utilize them and are not physically copied for each set of registers, as the values and indicators of such portions may be read by multiple registers and/or access to any of such values may be limited by timeslot. In another embodiment, any or all elements of the elements of the request object are physically copied to multiple portions of object storage 506 by values/table distributor 520.

When it has completed the above actions, values/table distributor 520 signals row retriever/decompressor 522.

When signaled, row retriever/decompressor 522 uses the data source identifier in object storage 506 to obtain, and optionally decompress in a conventional fashion, the first N rows of the relevant column of the data source in storage 314 via FPGA bus manager 508 and stores those optionally decompressed rows into row storage 504, which is a conventional set of latches, or may be conventional memory. FPGA bus manager 508 may include two conventional bus managers, one for each bus 316 and 318. In one embodiment, each row stored into row storage 504 is accessible to all registers in one set of registers, with each row available to a different set of registers and in another embodiment, the row is copied in row storage 504 by row retriever/decompressor 522 to allow simultaneous use by the registers in one set for each value. In one embodiment, each row of the relevant column includes a value of the column at that row, a bit identifying whether the row is valid, and a bit identifying whether the value of the column of the row is null.

Row retriever/decompressor 522 then enables the decompressed values to be used by registers 526 and enables registers 526.

Figure 6:
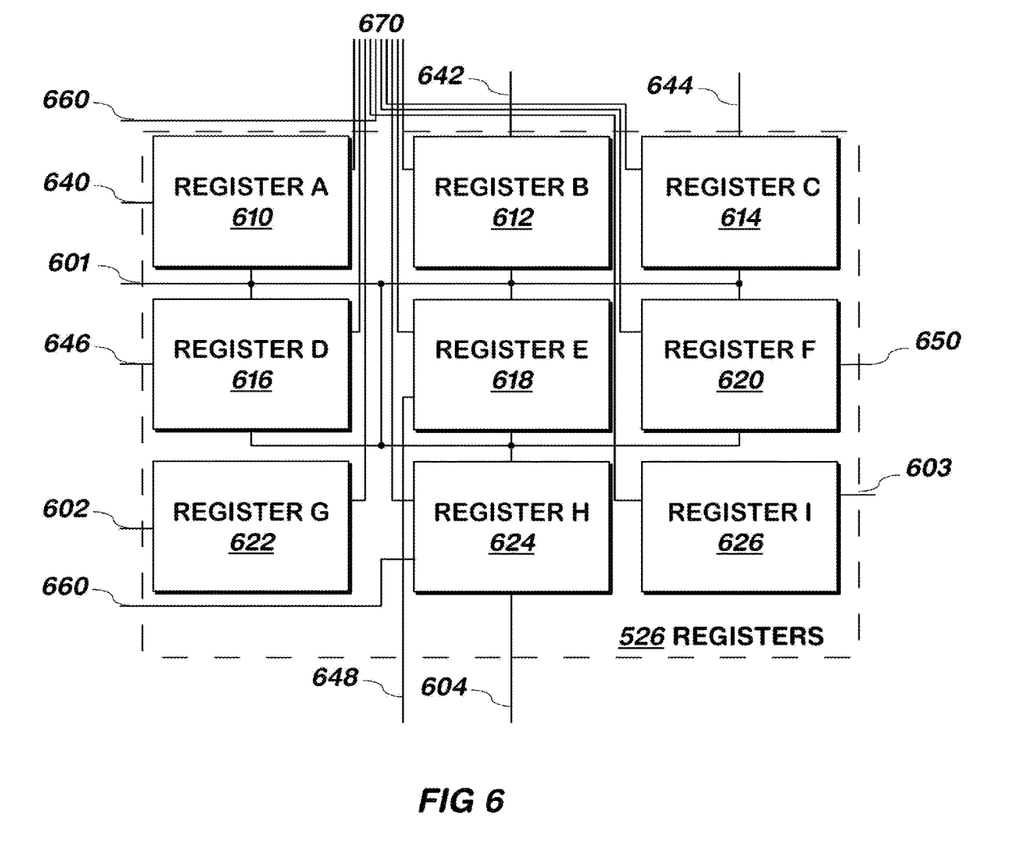
FIG. 6 is a block schematic diagram of a set of registers of the field programmable gate array or other acceleration hardware of FIG. 5 shown in more detail according to one embodiment of the present invention.

When enabled, the registers in each set of registers in registers 526 performs the functions described by their corresponding indicator in object storage 506 received at input 680. FIG. 6 shows one set of registers 526 in more detail, with registers 526 containing N sets of the type shown in FIG. 6, which each process a different row of the N rows read and optionally decompressed. Connections are indicated by a dot on FIG. 6, with lines that cross not indicated as a connection between such lines, unless otherwise noted or implied.

For purposes of example, the indicator for each register described below specifies a different function is to be performed by each register, although some registers may not be used and/or some registers may perform the same function as other registers. Registers 610-620 perform one of six logic functions according to the indicator for the register received at input 680, coupled to receive the corresponding indicators from object storage 506. It is noted that the indicator coupled to register 610 in one set will either be the same indicator or a copy thereof coupled to register 610 in a different set of registers. Registers 622-626 each perform only the function described and do not require an indicator, though, as noted, other embodiments allow the use of an indicator to perform such functions and registers performing such functions may perform some or all of the other functions described. There may be any number of registers that perform any given one or more functions.

Referring now to FIGS. 3, 4, 5, and 6, register A 610 is coupled to the value of the row of the relevant column for the set from row storage 504 at input 601 and generates at one of outputs 670 a logic value 1 if the value for register A 610 from object storage 506 at input 640 is equal to the value of the row of the relevant column, as specified by the indicator received at input 680 for that register.

Register B 612 is coupled to the value of the row of the relevant column for the set from row storage 504 at input 601 and generates at one of outputs 670 a logic value 1 if the value of the relevant column is greater than the value for register B 612 from object storage 506 at input 642, as specified by the indicator received at input 680 for that register.

Register C 614 is coupled to the value of the row of the relevant column for the set from row storage 504 at input 601 and generates at one of outputs 670 a logic value 1 if the value of the row of the relevant column is greater than or equal to the value for register C 612 from object storage 506 at input 644, as specified by the indicator received at input 680 for that register.

Register D 616 is coupled to the value of the row of the relevant column for the set from row storage 504 at input 601 and generates at one of outputs 670 a logic value 1 if the value of the row of the relevant column is less than or equal to the value for register D 616 from object storage 506 at input 646, as specified by the indicator received at input 680 for that register.

Register E 618 is coupled to the value of the row of the relevant column for the set from row storage 504 at input 601 and generates at one of outputs 670 a logic value 1 if the value of the row of the relevant column is less than the value for register E 618 from object storage 506 at input 648, as specified by the indicator received at input 680 for that register.

Register F 620 is coupled to the value of the row of the relevant column for the set from row storage 504 at input

601 and generates at one of outputs 670 a logic value 1 if the value of the relevant column is not equal to the value for register F 620 from object storage 506 at input 640, as specified by the indicator received at input 680 for that register.

Register G 622 is coupled to the null bit for the row of the relevant column for the set from row storage 504 at input 602 and generates at one of outputs 670 a logic value 1 if the null bit indicates a null value.

Register I 626 is coupled to the valid bit for the row of the relevant column for the set from row storage 504 at input 603 and generates at one of outputs 670 a logic value 1 if the valid bit indicates the row is valid.

Register H 624 is coupled to the value of the relevant column for the set from row storage 504 and hashes the value to produce a hash result, and then addresses the bloom filter stored in object storage 506 using the hash result via output 660 to receive the value of the bit stored at that address via input 604. Register 624 provides at one of outputs 670 the value of the bloom filter at that address, which is a logic value 1 if the hash result corresponds to the bloom filter.

Registers 610-626 generate a logic value 0 when they do not generate a logic value 1. As noted, each of inputs 640-650 in each set of registers 526 are coupled to receive the same value in every set, either through direct coupling or by copying the values they provide. Thus, for example, register A 610 in every set will receive the same value at input 640. The bloom filter coupled to register H at output 660 and input 604 is also the same bloom filter or a copy of the same bloom filter for every set. If it is the same bloom filter, access may be limited by timeslots so that different registers access it at different times. It is noted that the output of the bloom filter may be provided directly as one of outputs 670 instead of receiving it at input 604 and providing it through register H.

The outputs 670 of registers 610-626 in each set of registers 526 are used to address the logic lookup table stored in object storage 506 (either the same logic lookup table at different times, or different copies of the same logic lookup table), and the result is stored into output storage 528. Output storage 528 has at least one bit for each row of the original logic lookup table stored in storage 314 that will be processed at one time.

In one embodiment, row retriever/decompressor 522 maintains which row is being processed by which set of registers in registers 526 and enables a connection with, or retrieves and connects, the bit from output storage 528 stored previously and corresponding to the row being processed by the register set, and provides it via 660 as another address bit to address the logic lookup table being addressed by the outputs 670, allowing the logic lookup table output for the same row of a prior stage or previously processed column from a same request to be used to obtain the logic lookup table output for the current stage or column. The first such stage and column processed for a request would have a logic lookup table output that did not care what the value of this bit was. Use of the prior output for a row would occur, or the prior value would be latched for storage, before the new value was overwritten, or output storage 528 may be arranged to store an output for all of the rows of the data source database table that are to be processed in one batch plus N additional rows, so that when the output of all of the rows have been stored, storage then commences into the next N storage spaces in output storage 528 before overwriting any of the prior values.

Row retriever/decompressor 522 determines if there are additional rows in the data source, and if so, retrieves the next set of up to N rows and initiates the performance of the above-referenced process for such next N rows. Determination of whether there are more rows may be made using metadata, which row retriever/decompressor 522 retrieves before retrieving the rows, or using an end of rows marker, which row retriever/decompressor 522 detects.

As the above rows are being processed, values/tables identifier 416, prepares the values, logic lookup table, bloom filter and column identifier for any next stage or column while waiting for the signal, and provides them to values/table distributor 520, which stores them into a portion of object storage 506 that is different from the one being used to process the data source. When there are no further rows, row retriever/decompressor 522 signals values/tables distributor 520, which enables the values, logic lookup tables and bloom filter for the next stage or relevant column to be used in place of those for the prior stage or relevant column as described above, and initiates the repeating of the process described above using those values, logic lookup table and bloom filter.

The values, logic lookup table and bloom filter for the final stage or relevant column are marked by values/tables identifier 416 and the mark is provided to values/table distributor 520. If there is no next stage or column to process because the values, logic lookup table and bloom filter were so marked, when signaled by row retriever/decompressor 522, values/tables identifier 416 signals output manager 548 or signals output manager 548 with the requested columns, which, in one embodiment, provides the output for each row from the most recent stage or column stored in output storage 528 so that processor 310 can retrieve those rows, and in another embodiment, retrieves from storage 314 and provides to processor 310 the values of the requested columns for rows corresponding to a logic value of true in output storage 528 for the most recent column or stage, and does not provide the values of the requested columns for rows corresponding to a logic value of false in output storage 528 for the most recent column or stage.

Each system element may include logic circuitry, or a conventional hardware processor or hardware processor system or processor system or processor that is coupled to a hardware memory or hardware memory system or memory or memory system, each of these being conventional in nature. The processor is specially programmed to operate as described herein. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. System elements are coupled to one another to perform the functions described herein and may utilize data obtained in any possible manner.

Certain Embodiments of the Present Invention

A method of providing a subset of a database table is described, including:

A. receiving a criteria for identifying the subset of the database table, including two or more rows and two or more columns;

B. identifying at least one relevant column from the two or more of columns responsive to the criteria received;

C. selecting a relevant column from the at least one relevant column identified;

D. identifying at least one function applicable to the selected relevant column in the criteria;

E. identifying at least one value for each of the at least one function identified;

F. distributing each of the at least one value identified to a register, in two or more hardware registers, capable of i) performing the function for which said value was identified and ii) producing a binary value responsive to the function being true or false for said value and a provided value of the selected relevant column;

G. storing in an addressable memory a binary table having a binary value of true at each address corresponding to a combination of the at least one binary value produced by each of the at least one register that corresponds to the criteria being met for the selected relevant column, and a binary value of false otherwise;

H. obtaining a value from a row of the selected relevant column from the database table;

I. distributing the value obtained to each of the at least one register;

J. applying the function to the value corresponding to the register and the value from the relevant column at each of the at least one register to produce the binary value;

K. applying the binary value produced by each of the at least one register as at least a part of an address of the addressable memory to obtain the binary value of the binary table corresponding to that address;

L. providing at least one value from the database table row from which the value of the relevant column was obtained, responsive to the binary value of the binary table corresponding to the address being true, and not providing the value of the database table row from which the value of the relevant column was obtained responsive to the binary value of the binary table corresponding to the address being false; and M. repeating steps H-L for each of two or more different rows of the database table.

The method may include additional features whereby:

the at least one relevant column comprises two or more relevant columns; and the method additionally includes:

selecting an additional relevant column from the two or more of relevant columns identified; and repeating steps D-M for the additional relevant column.

The method may include additional features whereby the binary value of the binary table from the relevant column is applied as another part of the address of the addressable memory as part of step K for the additional relevant column.

The method may include additional features whereby:

the at least one function is identified from a set of functions;

the at least one register comprises two or more registers; and at least one of the two or more of registers is unable to perform at least one of the functions in the set.

The method may include additional features whereby a first of the two or more of registers is able to perform a first number of two or more the functions in the set, and a second of the two or more of registers is able to perform a second number, different from the first number, of functions in the set.

The method may include additional features whereby the at least one function comprises determining whether the value from the row is in a bloom filter including the value identified for said function.

A system for providing a subset of a database table is described, including:

a filter receiver having an input for receiving a criteria for identifying the subset of the database table, including two or more rows and two or more columns, the filter receiver for providing the criteria at an output;

a relevant column identifier having an input coupled to the filter receiver output for receiving the criteria, the relevant column identifier for identifying at least one relevant column from the two or more of columns responsive to the criteria received and for providing an identifier of the at least one relevant column at an output;

a values/table identifier having an input coupled to the relevant column identifier output for receiving the identifier of the at least one relevant column, the values table identifier for selecting a relevant column from the at least one relevant column identified and providing at an output an identifier of the selected relevant column, identifying at least one function applicable to the selected relevant column in the criteria, identifying at least one value for each of the at least one function identified, distributing via an output each of the at least one value identified to a register, in two or more hardware registers, capable of i) performing the function for which said value was identified and ii) producing a binary value responsive to the function being true or false for said value and a provided value of the selected relevant column and storing via the values/table identifier output in an output storage including an addressable memory a binary table having a binary value of true at each address corresponding to a combination of the at least one binary value produced by each of the at least one register that corresponds to the criteria being met for the selected relevant column, and a binary value of false otherwise;

a row retriever/decompressor having an input coupled to the values/table identifier for receiving the identifier of the selected relevant column, the row retriever for obtaining via an input/output a value from a row of the selected relevant column from the database table and for distributing via an output the value obtained to each of the at least one register;

the at least one register, each of the at least one register having an input coupled to the values table identifier for receiving one of the at least one value and to the row retriever/decompressor for receiving the value from the row of the selected relevant column of the database table, each register for applying the function to the value corresponding to said register and the value from the relevant column to produce the binary value and for providing the binary value at an output coupled to an address input of the output storage;

the output storage for applying the binary value as at least a part of an address to obtain the binary value of the binary table corresponding to that address and for providing the binary value of the binary table corresponding to the address at an output; and an output manager having an input coupled to the output storage output for receiving the binary value of the binary table, the output manager for providing at least one value from the database table row from which the value of the relevant column was obtained, responsive to the binary value of the binary table corresponding to the address being true, and not providing the value of the database table row from which the value of the relevant column was obtained responsive to the binary value of the binary table corresponding to the address being false; and wherein operation of the row retriever/decompressor, the at least one register, the output storage and the output manager are repeated for each of two or more different rows of the database table.

The system may include additional features whereby:

the at least one relevant column comprises two or more relevant columns;

the values/table identifier is additionally for selecting an additional relevant column from the two or more of relevant columns identified and providing an identifier of the selected additional relevant column at the values/table identifier output; and operation of a remainder of the values/table identifier, the at least one register, the output storage and the output manager is additionally repeated using the selected additional relevant column in place of the selected relevant column.

The system may include additional features whereby the binary value of the binary table from the relevant column is applied as another part of the address input to the output storage as part of the additionally repeated operation.

The system may include additional features whereby:

the at least one function is identified from a set of functions;

the at least one register comprises two or more registers; and at least one of the two or more of registers is unable to perform at least one of the functions in the set.

The system may include additional features whereby a first of the two or more of registers is able to perform a first number of two or more the functions in the set, and a second of the two or more of registers is able to perform a second number, different from the first number, of functions in the set.

The system may include additional features whereby the at least one function comprises determining whether the value from the row is in a bloom filter including the value identified for said function.

A computer program product including a nontransitory computer useable medium having computer readable program code embodied therein is described for providing a subset of a database table, the computer program product including computer readable program code devices configured to cause a computer system to:

A. receive a criteria for identifying the subset of the database table, including two or more rows and two or more columns;

B. identify at least one relevant column from the two or more of columns responsive to the criteria received;

C. select a relevant column from the at least one relevant column identified;

D. identify at least one function applicable to the selected relevant column in the criteria;

E. identify at least one value for each of the at least one function identified;

F. distribute each of the at least one value identified to a register, in two or more hardware registers, capable of i) performing the function for which said value was identified and ii) producing a binary value responsive to the function being true or false for said value and a provided value of the selected relevant column;

G. store in an addressable memory a binary table having a binary value of true at each address corresponding to a combination of the at least one binary value produced by each of the at least one register that corresponds to the criteria being met for the selected relevant column, and a binary value of false otherwise;

H. obtain a value from a row of the selected relevant column from the database table;

I. distribute the value obtained to each of the at least one register;

J. apply the function to the value corresponding to the register and the value from the relevant column at each of the at least one register to produce the binary value;

K. apply the binary value produced by each of the at least one register as at least a part of an address of the addressable memory to obtain the binary value of the binary table corresponding to that address;

L. provide at least one value from the database table row from which the value of the relevant column was obtained, responsive to the binary value of the binary table corresponding to the address being true, and not providing the value of the database table row from which the value of the relevant column was obtained responsive to the binary value of the binary table corresponding to the address being false; and M. repeating operation of computer readable program code devices H-L for each of two or more different rows of the database table.

The computer program product may include additional features whereby:

wherein the at least one relevant column comprises two or more relevant columns; and the computer program product additionally comprises computer readable program code devices configured to cause the computer system to:

select an additional relevant column from the two or more of relevant columns identified; and repeat operation of computer readable program code devices D-M for the additional relevant column.

The computer program product may include additional features whereby the binary value of the binary table from the relevant column is applied as another part of the address of the addressable memory as part of operation of computer readable program code devices K for the additional relevant column.

The computer program product may include additional features whereby:

the at least one function is identified from a set of functions;

the at least one register comprises two or more registers; and at least one of the two or more of registers is unable to perform at least one of the functions in the set.

The computer program product may include additional features whereby a first of the two or more of registers is able to perform a first number of two or more the functions in the set, and a second of the two or more of registers is able to perform a second number, different from the first number, of functions in the set.

The computer program product may include additional features whereby the at least one function comprises determining whether the value from the row is in a bloom filter including the value identified for said function.

Each system element may include a conventional hardware processor or hardware processor system or processor system or processor that is coupled to a hardware memory or hardware memory system or memory or memory system, each of these being conventional in nature. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa.

What is claimed is:

1. A method of providing a subset of a database table, comprising:
   A. receiving a criteria for identifying the subset of the database table comprising a plurality of rows and a plurality of columns;
   B. identifying at least one relevant column from the plurality of columns, responsive to the criteria received;
   C. selecting a relevant column from the at least one relevant column identified;
   D. identifying at least one function responsive to at least a portion of the criteria applicable to the selected relevant column;
   E. using the function to identify at least one value for each of the at least one function identified;
   F. distributing each of the at least one value identified to a register, in a plurality of hardware registers, capable of i) performing the function for which said value was identified and ii) producing a binary value responsive to said function being true or false for said value and a provided value of the selected relevant column;
   G. storing in an addressable memory a binary table having a binary value of true at each address of the table corresponding to a combination of at least one binary value produced by each of at least one register that corresponds to the criteria being met for the selected relevant column at all times, and a binary value of false otherwise, prior to a first operation of step K;
   H. obtaining a value from a row of the selected relevant column from the database table;
   I. distributing the value obtained to each of the at least one register;
   J. applying the function to the value corresponding to the register and the value from the relevant column at each of the at least one register to produce the binary value;
   K. applying the binary value produced by each of the at least one register as at least a part of an address of the addressable memory to obtain the binary value of the binary table corresponding to that address;
   L. providing at least one value from the database table row from which the value of the relevant column was obtained, responsive to the binary value of the binary table corresponding to said address being true, and not providing the value of the database table row from which the value of the relevant column was obtained responsive to the binary value of the binary table corresponding to said address being false; and
   M. repeating steps H-L for each of a plurality of different rows of the database table.

2. The method of claim 1:
   wherein the at least one relevant column comprises a plurality of relevant columns; and
   the method additionally comprises:
      selecting an additional relevant column from the plurality of relevant columns identified; and
      repeating steps D-M for the additional relevant column.

3. The method of claim 2, wherein the binary value of the binary table from the relevant column is applied as another part of the address of the addressable memory as part of step K for the additional relevant column.

4. The method of claim 1, wherein:
   the at least one function is identified from a set of functions;
   the at least one register comprises a plurality of registers; and
   at least one of the plurality of registers is unable to perform at least one of the functions in the set.

5. The method of claim 4, wherein a first of said plurality of registers is able to perform a first number of a plurality of the functions in the set, and a second of said plurality of registers is able to perform a second number, different from the first number, of functions in the set.

6. The method of claim 1, wherein the at least one function comprises determining whether the value from the row is in a bloom filter comprising the value identified for said function.

7. A system for providing a subset of a database table, comprising:
   a filter receiver having an input for receiving a criteria for identifying the subset of the database table comprising a plurality of rows and a plurality of columns, the filter receiver for providing the criteria at an output;
   a relevant column identifier having an input coupled to the filter receiver output for receiving the criteria, the relevant column identifier for identifying at least one relevant column from the plurality of columns responsive to the criteria received and for providing an identifier of the at least one relevant column at an output;
   a values/table identifier having an input coupled to the relevant column identifier output for receiving the identifier of the at least one relevant column, the values table identifier for selecting a relevant column from the at least one relevant column identified and providing at an output an identifier of the selected relevant column, identifying at least one function responsive to at least a portion of the criteria applicable to the selected relevant column, using the function to identify at least one value for each of the at least one function identified, distributing via the output each of the at least one value identified to a register, in a plurality of hardware registers, capable of i) performing the function for which said value was identified and ii) producing a binary value responsive to said function being true or false for said value and a provided value of the selected relevant column and storing via the values/table identifier output in an output storage comprising an addressable memory a binary table having a binary value of true at each address corresponding to a combination of at least one binary value produced by each of at least one register that corresponds to the criteria being met for the selected relevant column, and a binary value of false otherwise, prior to a first application of the binary table by the output storage;
   a row retriever/decompressor having an input coupled to the values/table identifier for receiving the identifier of the selected relevant column, the row retriever/decompresser for obtaining via an input/output a value from a row of the selected relevant column from the database table and for distributing via an output the value obtained to each of the at least one register;
   the at least one register, each of the at least one register having an input coupled to the values table identifier for receiving one of the at least one value and to the row retriever/decompressor for receiving the value from the row of the selected relevant column from the database table, each register for applying the function to the value corresponding to said register and the value from the relevant column to produce the binary value and for providing the binary value at an output coupled to an address input of the output storage;

the output storage for applying the binary value as at least a part of an address to obtain the binary value of the binary table corresponding to that address and for providing the binary value of the binary table corresponding to the address at an output; and an output manager having an input coupled to the output storage output for receiving the binary value of the binary table, the output manager for providing at least one value from the database table row from which the value of the relevant column was obtained, responsive to the binary value of the binary table corresponding to said address being true, and not providing the value of the database table row from which the value of the relevant column was obtained, responsive to the binary value of the binary table corresponding to said address being false; and wherein operation of the row retriever/decompressor, the at least one register, the output storage and the output manager are repeated for each of a plurality of different rows of the database table.

8. The system of claim 7, wherein:

the at least one relevant column comprises a plurality of relevant columns;

the values/table identifier is additionally for selecting an additional relevant column from the plurality of relevant columns identified and providing an identifier of the selected additional relevant column at the values/table identifier output; and operation of a remainder of the values/table identifier, the at least one register, the output storage and the output manager is additionally repeated using the selected additional relevant column in place of the selected relevant column.

9. The system of claim 8, wherein the binary value of the binary table from the relevant column is applied as another part of the address input to the output storage as part of the additionally repeated operation.

10. The system of claim 7, wherein:

the at least one function is identified from a set of functions;

the at least one register comprises a plurality of registers; and at least one of the plurality of registers is unable to perform at least one of the functions in the set.

11. The system of claim 10, wherein a first of said plurality of registers is able to perform a first number of a plurality of the functions in the set, and a second of said plurality of registers is able to perform a second number, different from the first number, of functions in the set.

12. The system of claim 7, wherein the at least one function comprises determining whether the value from the row is in a bloom filter comprising the value identified for said function.

13. A computer program product comprising a nontransitory computer useable medium having computer readable program code embodied therein for providing a subset of a database table, the computer program product comprising computer readable program code devices configured to cause a computer system to:

A. receive a criteria for identifying the subset of the database table comprising a plurality of rows and a plurality of columns;

B. identify at least one relevant column from the plurality of columns, responsive to the criteria received;

C. select a relevant column from the at least one relevant column identified;

D. identify at least one function responsive to at least a portion of the criteria applicable to the selected relevant column;

E. use the function to identify at least one value for each of the at least one function identified;

F. distribute each of the at least one value identified to a register, in a plurality of hardware registers, capable of i) performing the function for which said value was identified and ii) producing a binary value responsive to said function being true or false for said value and a provided value of the selected relevant column;

G. store in an addressable memory a binary table having a binary value of true at each address of the table corresponding to a combination of the at least one binary value produced by each of the at least one register that corresponds to the criteria being met for the selected relevant column at all times, and a binary value of false otherwise prior to a first operation of element K;

H. obtain a value from a row of the selected relevant column from the database table;

I. distribute the value obtained to each of the at least one register;

J. apply the function to the value corresponding to the register and the value from the relevant column at each of the at least one register to produce the binary value;

K. apply the binary value produced by each of the at least one register as at least a part of an address of the addressable memory to obtain the binary value of the binary table corresponding to that address;

L. provide at least one value from the database table row from which the value of the relevant column was obtained, responsive to the binary value of the binary table corresponding to said address being true, and not providing the value of the database table row from which the value of the relevant column was obtained responsive to the binary value of the binary table corresponding to said address being false; and M. repeating operation of computer readable program code devices H-L for each of a plurality of different rows of the database table.

14. The computer program product of claim 13:

wherein the at least one relevant column comprises a plurality of relevant columns; and the computer program product additionally comprises computer readable program code devices configured to cause the computer system to:

select an additional relevant column from the plurality of relevant columns identified; and repeat operation of computer readable program code devices D-M for the additional relevant column.

15. The computer program product of claim 14, wherein the binary value of the binary table from the relevant column is applied as another part of the address of the addressable memory as part of operation of computer readable program code devices K for the additional relevant column.

16. The computer program product of claim 13, wherein:

the at least one function is identified from a set of functions;

the at least one register comprises a plurality of registers; and at least one of the plurality of registers is unable to perform at least one of the functions in the set.

17. The computer program product of claim 16, wherein a first of said plurality of registers is able to perform a first number of a plurality of the functions in the set, and a second of said plurality of registers is able to perform a second number, different from the first number, of functions in the set.

18. The computer program product of claim 13, wherein the at least one function comprises determining whether the value from the row is in a bloom filter comprising the value identified for said function.

* * * * *